(12) United States Patent
Bollschweiler

(10) Patent No.: US 12,275,294 B2
(45) Date of Patent: Apr. 15, 2025

(54) SELECTIVELY EXTENSIBLE TRUCK BED COVERING ASSEMBLY

(71) Applicant: Darin Bollschweiler, South Jordan, UT (US)

(72) Inventor: Darin Bollschweiler, South Jordan, UT (US)

( * ) Notice: Subject to any disclaimer, the term of this patent is extended or adjusted under 35 U.S.C. 154(b) by 280 days.

(21) Appl. No.: 18/088,698

(22) Filed: Dec. 26, 2022

(65) Prior Publication Data

US 2024/0208307 A1    Jun. 27, 2024

(51) Int. Cl.
*B60J 7/14*      (2006.01)
*B60J 7/16*      (2006.01)

(52) U.S. Cl.
CPC ............. *B60J 7/141* (2013.01); *B60J 7/1607* (2013.01)

(58) Field of Classification Search
CPC ... B60J 7/141; B60J 7/16; B60J 7/1607; B60J 7/1614; B60P 7/02
USPC ........................................ 296/100.02, 100.05
See application file for complete search history.

(56) References Cited

U.S. PATENT DOCUMENTS

| | | | |
|---|---|---|---|
| 4,815,786 A | 3/1989 | McRay | |
| 5,951,095 A | 9/1999 | Herndon | |
| 7,243,965 B2* | 7/2007 | King | B60J 7/1614 296/26.06 |
| 8,007,024 B2 | 8/2011 | Kealy | |
| 9,475,371 B2 | 10/2016 | LaBiche | |
| 9,849,763 B1* | 12/2017 | Sullivan | B60R 9/00 |
| 10,046,628 B1 | 8/2018 | Fulton | |
| 10,538,151 B2* | 1/2020 | Sullivan | B60J 7/12 |
| 10,611,219 B2 | 4/2020 | Trinier | |
| D935,979 S | 11/2021 | Titus | |
| 11,505,048 B2* | 11/2022 | King | B60J 7/1204 |
| 11,926,203 B2* | 3/2024 | Osborn | B60J 7/1614 |
| 2008/0174142 A1* | 7/2008 | Pearlman | B60J 7/1614 296/100.1 |
| 2011/0001333 A1* | 1/2011 | Bruestle | B60J 7/1614 296/100.05 |
| 2018/0118005 A1* | 5/2018 | Molinar Olivas | B60J 7/1614 |
| 2019/0061497 A1* | 2/2019 | Trinier | B60J 7/198 |
| 2019/0168590 A1* | 6/2019 | O'Reilly | B60J 7/141 |

FOREIGN PATENT DOCUMENTS

WO    WO2007050389    5/2007

\* cited by examiner

*Primary Examiner* — Jason S Daniels

(57) ABSTRACT

A selectively extensible truck bed covering assembly for selectively expanding cargo capacity of a truck bed includes a top panel, a pair of side panels, and a plurality of linear actuators. Each side panel is slidably attached to the top panel and is configured to be hingedly mountable to a respective sidewall of a bed of a truck. The linear actuators are slidably attached to the pair of side panels and mountable to the bed. The linear actuators are positioned to selectively motivate the top panel and the side panels between stowed and deployed configurations. When stowed, the top panel and the side panels are substantially parallel planar relative to a floor of the bed and are positioned atop the sidewalls. When deployed, the side panels are nonplanar with the top panels, and a substantially cuboid compartment is defined by the top panel, the side panels, and the bed.

20 Claims, 4 Drawing Sheets

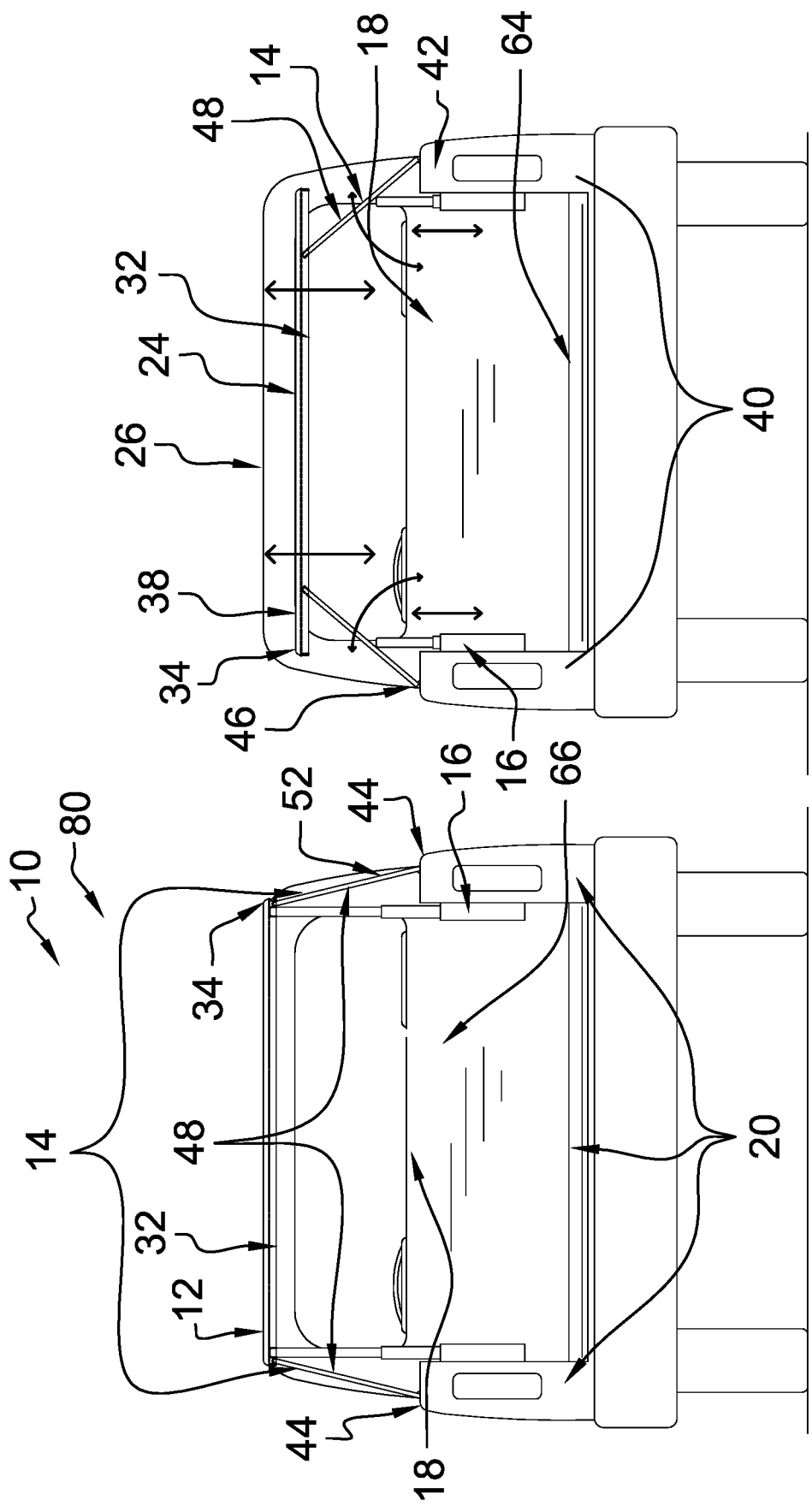

1

SELECTIVELY EXTENSIBLE TRUCK BED COVERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to truck bed covering assemblies and more particularly pertains to a new truck bed covering assembly for selectively expanding cargo capacity of a truck bed. The present invention discloses truck bed covering assembly comprising a selectively raisable and rigid top panel to which are slidably attached a pair of rigid side panels.

(2) Description of Related Art Including Information Disclosed Under 37 CFR 1.97 and 1.98

The prior art relates to truck bed covering assemblies, which may comprise bed covers that can be raised by linear actuators and which may have non-rigid side panels, bed covers comprising multiple panels connected by hinges that can rest on a floor of a truck bed and which can be scissor-jacked to cover the truck bed, and bed covers comprising rollable tops and side panels. Related prior art comprises campers mountable within truck beds of and having tops that can be raised by linear actuators. What is lacking in the prior art is a truck bed covering assembly comprising a rigid top panel and rigid side panels, which are selectively deployable from a stowed configuration to a deployed configuration by a plurality of linear actuators.

BRIEF SUMMARY OF THE INVENTION

An embodiment of the disclosure meets the needs presented above by generally comprising a top panel, a pair of side panels, and a plurality of linear actuators. The top panel is sized and shaped substantially complementarily to a top opening of a bed of a truck. Each side panel is slidably attached to the top panel and is configured to be hingedly mountable to a respective sidewall of the bed. The linear actuators are slidably attached to the pair of side panels and are configured to be mountable to the bed of the truck. The linear actuators are positioned to selectively motivate the top panel and the side panels between a stowed configuration and a deployed configuration. In the stowed configuration, the top panel and the side panels are substantially parallel planar relative to a floor of the bed and are positioned atop the sidewalls. In the deployed configuration, the side panels are nonplanar with the top panels, and a substantially cuboid compartment is defined by the top panel, the side panels, and the bed.

Another embodiment of the disclosure includes a selectively extensible truck bed covering system, which comprises a truck having a bed that comprises a floor and a pair of sidewalls. The selectively extensible truck bed covering system also comprises a selectively extensible truck bed covering assembly, according to the disclosure above, which has been mounted to the bed of the truck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a rear in-use view of an embodiment of the disclosure.

FIG. 4 is a rear in-use view of an embodiment of the disclosure.

DETAILED DESCRIPTION OF THE INVENTION

Figure 1:
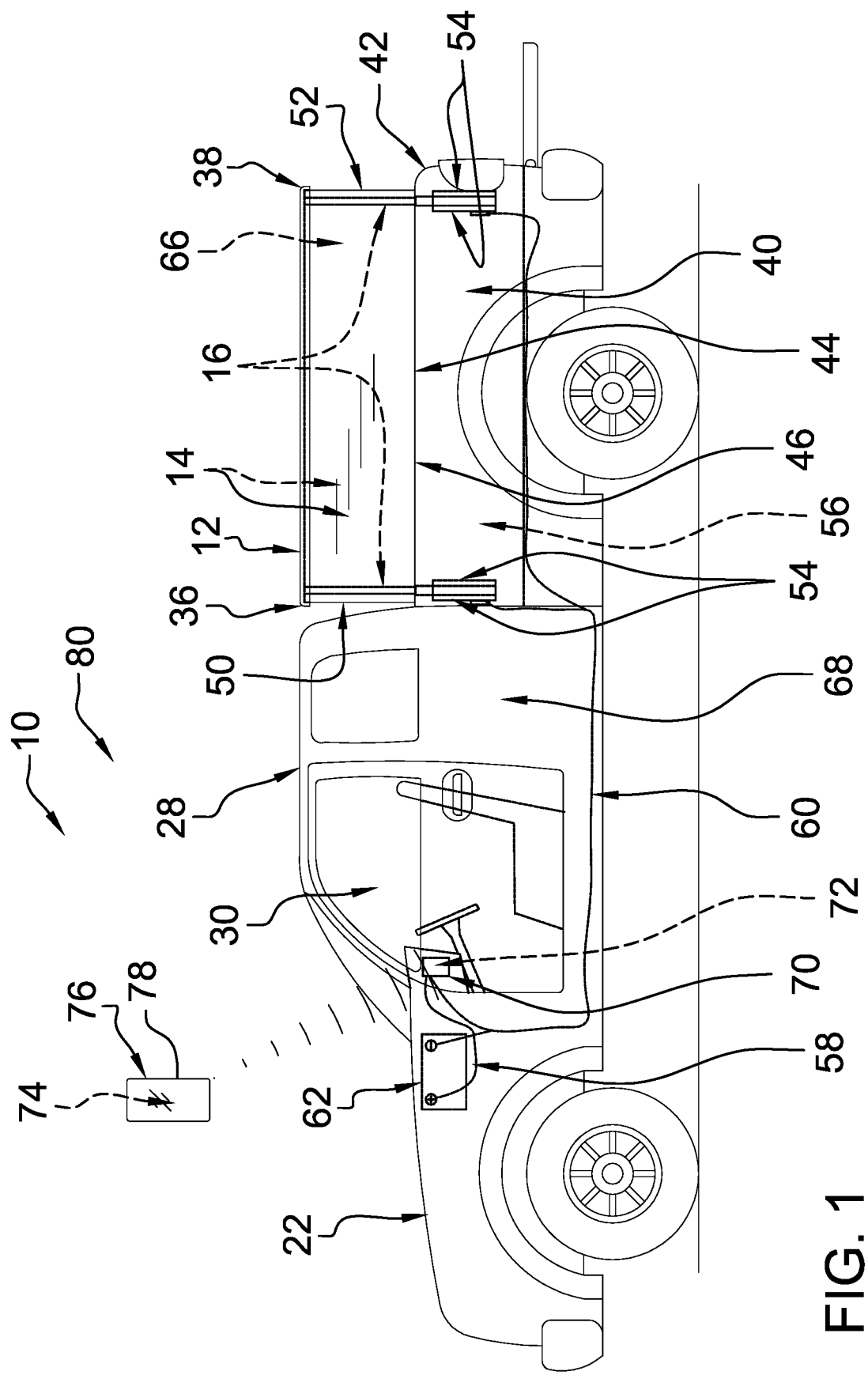
FIG. 1 is a side in-use view of a selectively extensible truck bed covering assembly according to an embodiment of the disclosure.
Figure 2:
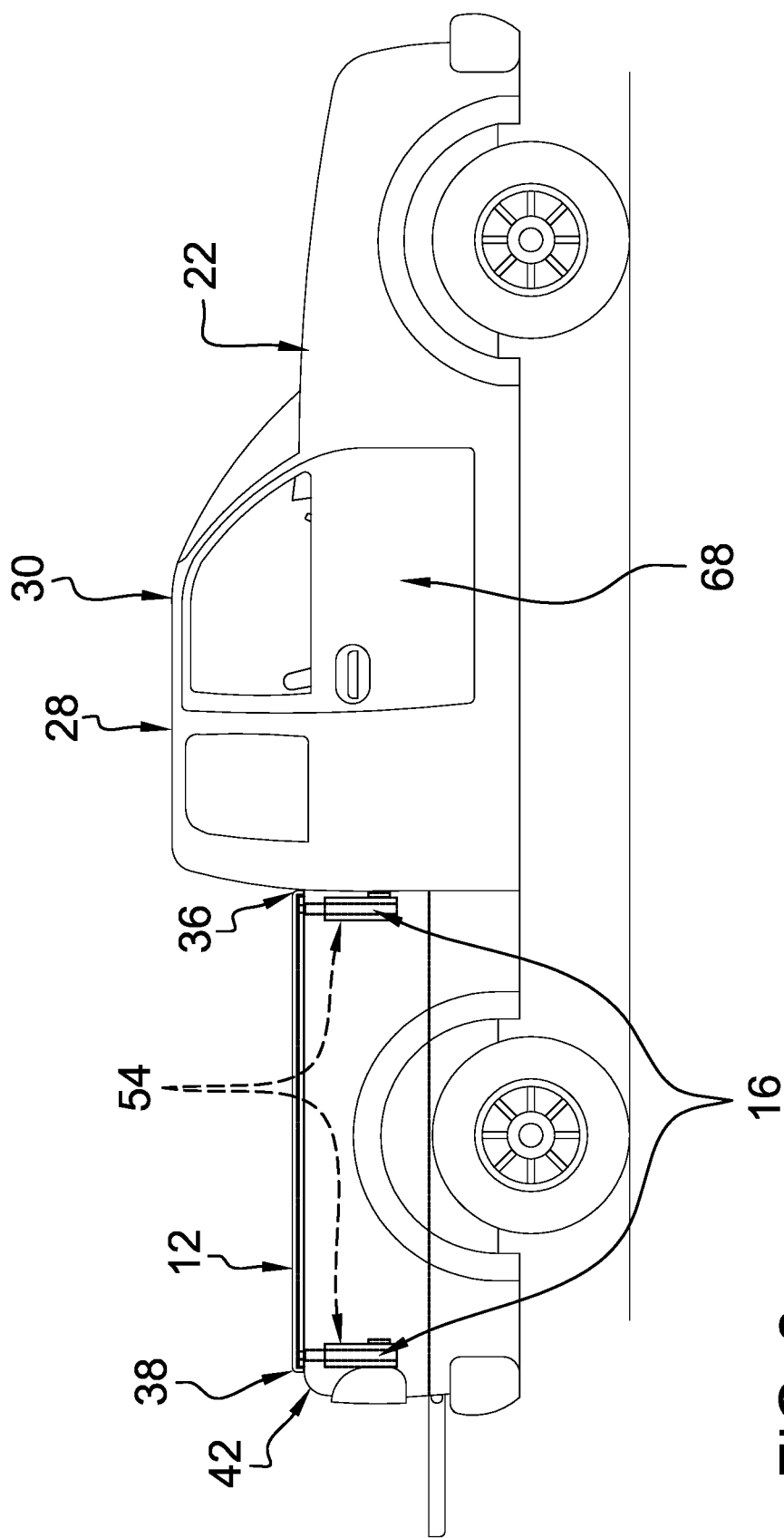
FIG. 2 is a side in-use view of an embodiment of the disclosure.

With reference now to the drawings, and in particular to FIGS. 1 through 5 thereof, a new truck bed covering assembly embodying the principles and concepts of an embodiment of the disclosure and generally designated by the reference numeral 10 will be described.

As best illustrated in FIGS. 1 through 5, the selectively extensible truck bed covering assembly 10 generally comprises a top panel 12, a pair of side panels 14, and a plurality of linear actuators 16. The top panel 12 is sized and shaped substantially complementarily to a top opening 18 of a bed 20 of a truck 22. The top panel 12 may have a panel width 24 that is substantially equivalent to a width 26 of a top 28 of a cab 30 of the truck 22, as shown in FIG. 3.

A plurality of top rails 32 is attached to the top panel 12, with each top rail 32 being perpendicular to opposed edges 34 of the top panel 12. The plurality of top rails 32 may comprise two top rails 32, which are positioned singly proximate to a front edge 36 and a rear edge 38 of the top panel 12.

Each side panel 14 is slidably attached to the top panel 12 and is configured to be hingedly mountable to a respective sidewall 40 of the bed 20. As shown in FIG. 1, the side panel 14 extend along the respective sidewall 40 from proximate to the cab 30 of the truck 22 to proximate to a rear 42 of the truck 22. Each hinge 44 of a plurality of hinges 44 is attached to a respective side panel 14, proximate to a lower end 46 of the respective side panel 14 and is configured to be attached to the sidewall 40 of the bed 20. A plurality of side rails 48 is attached to the side panels 14, with each side rail 48 being coplanar with an associated top rail 32. The plurality of side rails 48 may comprise four side rails 48, which are positioned singly proximate to a front end 50 and a rear end 52 of each side panel 14.

The linear actuators 16 are slidably attached to the pair of side panels 14 and are configured to be mountable to the bed 20 of the truck 22. More specifically, each linear actuator 16 is slidably attached to a respective side rail 48. The present invention anticipates a plurality of mounting brackets 54, with each mounting bracket 54 being attached to a respective linear actuator 16 and configured to be attachable to a respective bed rail 56 of the truck 22. The mounting brackets 54 allow for quick and reversible attachment of the plurality of linear actuators 16 to the bed 20 by using the bed rails 56 that are integral to the bed 20.

As shown in FIG. 1, the plurality of linear actuators 16 is electrically powered and is configured to be operationally engaged an electrical circuit 58 of the truck 22. Such trucks 22 typically are configured to have wiring 60 run from their batteries 62 to their beds 20 without requiring holes to be drilled in their beds 20. The present invention anticipates other types of linear actuators 16, such as, but not limited to, hydraulic cylinders, air pistons, and the like.

The plurality of linear actuators 16 may comprise four linear actuators 16, although the present invention anticipates other configurations for the selectively extensible truck bed covering assembly 10 comprising other numbers of linear actuators 16, side rails 48, and top rails 32. For example, a configuration of six linear actuators 16, six side rails 48, and three top rails 32 is anticipated, as is a configuration comprising eight linear actuators 16, eight side rails 48, and four top rails 32. Additionally, each top rail 32 need not extend substantially between the opposed edges 34 of the top panel 12. For example, four top rails 32 could be positioned two-apiece proximate to the front edge 36 and the rear edge 38 of the top panel 12, with each top rail 32 extending from a one opposed edge 34 of the top panel 12 toward, but not meeting, another top rail 32 extending from the other opposed edge 34.

Figure 5:
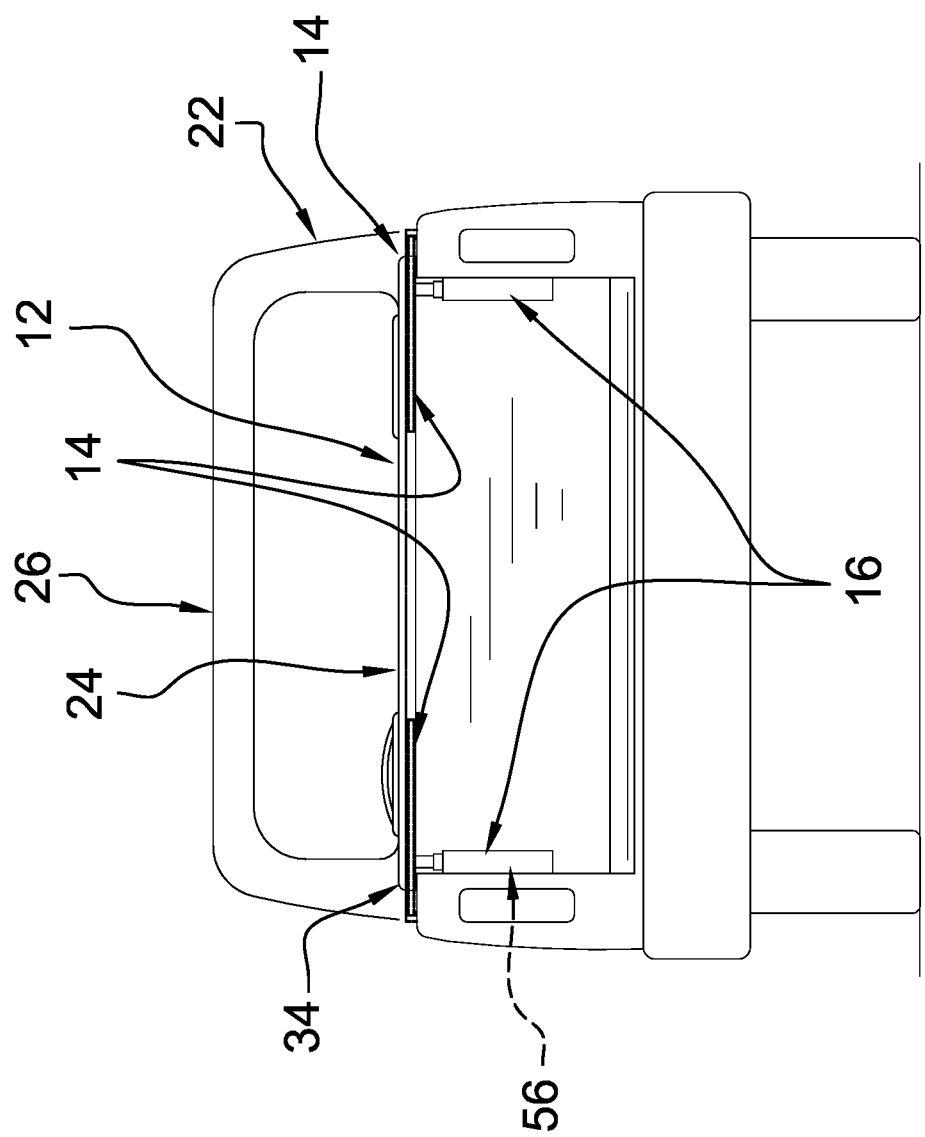
FIG. 5 is a rear in-use view of an embodiment of the disclosure.

The linear actuators 16 are positioned to selectively motivate the top panel 12 and the side panels 14 between a stowed configuration, as shown in FIG. 5, and a deployed configuration, as shown in FIG. 3. In the stowed configuration, the top panel 12 and the side panels 14 are substantially parallel planar relative to a floor 64 of the bed 20 and are positioned atop the sidewalls 40. In the deployed configuration, the side panels 14 are nonplanar with the top panel 12s, and a substantially cuboid compartment 66 is defined by the top panel 12, the side panels 14, and the bed 20.

With the top panel 12 having a panel width 24 that is substantially equivalent to the width 26 of the top 28 of the cab 30, each side panel 14 is angled, in the deployed configuration, complementarily to an associated side 68 of the cab 30, as shown in FIG. 3. This minimizes drag of the selectively extensible truck bed covering assembly 10 in the deployed configuration. Additionally, the selectively extensible truck bed covering assembly 10 can be configured such that the top panel 12 is substantially coplanar with the top 28 of the cab 30, which also minimizes drag.

A controller 70 is operationally engaged to the plurality of linear actuators 16 and is configured to be mountable to the truck 22 so that the controller 70 is positioned to selectively actuate the plurality of linear actuators 16. As shown in FIG. 1, the controller 70 is mounted within the cab 30 of the truck 22 and is wired to a battery 62 of the truck 22. As such, the controller 70 could be directly manipulated by a user. The present invention also anticipates the controller 70 comprising a receiver 72, which would enable wireless control and enable mounting of the controller 70 at various positions within and upon the truck 22. The controller 70 also could be independently battery-powered, thereby not requiring use of the battery 62 of the truck 22.

Programming code 74, which is selectively positionable on an electronic device 76 of the user, enables the electronic device 76 to selectively signal the controller 70 to actuate the plurality of linear actuators 16. The programming code 74 allows the user to control the selectively extensible truck bed covering assembly 10 from their electronic device 76, such as a smartphone 78, as shown in FIG. 1.

Although not shown in FIGS. 1-5, the present invention also anticipates a front panel, which is attached to the front edge 36 of the top panel 12. For example, a front panel that is rigid could extend perpendicularly from the top panel 12. In the deployed configuration, there would be a gap between the front panel and each side panel 14, but these gaps could be closed easily using flexible panels and hook and loop fasteners. Also anticipated, but not shown in FIGS. 1-5, is a rear panel, which is attached to, or is selectively attachable to, the rear edge 38 of the top panel 12. For example, a rear panel hingedly attached to the top panel 12 could be stowed atop the top panel 12 when not in use, and perhaps secured in that position using a clip or other fastening means. Additionally, the front panel and the rear panel could comprise flexible panels that are affixed with closures such as, but not limited to, hook and loop fasteners, snaps, zippers, and the like.

The present invention anticipates a selectively extensible truck bed covering system 80, which comprises a truck 22 having a bed 20 that comprises a floor 64 and a pair of sidewalls 40. The selectively extensible truck bed covering system 80 also comprises a selectively extensible truck bed covering assembly 10, according to the specification above, which has been mounted to the bed 20 of the truck 22.

In use, the selectively extensible truck bed covering assembly 10 is mounted to the bed 20 of the truck 22. In the stowed configuration, items are positionable on the floor 64 of the bed 20 and are protected from the elements by the selectively extensible truck bed covering assembly 10. The plurality of linear actuators 16 can be actuated selectively to hinge the side panels 14 while concurrently elevating the top panel 12. This creates a substantially cuboid compartment 66 with increased storage capacity, which can handle more and/or larger items, with the top panel 12 and the side panels 14 still providing significant protection of the items from the elements.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A selectively extensible truck bed covering assembly comprising:
    a top panel sized and shaped substantially complementarily to a top opening of a bed of a truck;
    a pair of side panels slidably attached to the top panel, each side panel being configured to be hingedly mountable to a respective sidewall of the bed; and
    a plurality of linear actuators configured to be mountable to the bed of the truck in a vertical orientation perpendicular to the bed of the truck, the plurality of linear actuators being slidably attached to the pair of side panels, such that the plurality of linear actuators is positioned for selectively motivating the top panel and the side panels between a stowed configuration, wherein the top panel and the side panels are substantially parallel planar relative to a floor of the bed and are positioned atop the sidewalls, and a deployed configuration, wherein the side panels are nonplanar with the top panel, and wherein the top panel, the side panels, and the bed define a substantially cuboid compartment, each of the linear actuators remaining in the vertical orientation between the stowed configuration and the deployed configuration.

2. The selectively extensible truck bed covering assembly of claim 1, wherein the top panel has a panel width substantially equivalent to a width of a top of a cab of the truck.

3. The selectively extensible truck bed covering assembly of claim 1, wherein the side panel extends along the respective sidewall from proximate to the cab of the truck to proximate to a rear of the truck.

4. The selectively extensible truck bed covering assembly of claim 1, further including a plurality of hinges, each hinge being attached to a respective side panel proximate to a lower end of the respective side panel and being configured for attaching to the sidewall of the bed.

5. The selectively extensible truck bed covering assembly of claim 1, further including:
    a plurality of top rails attached to the top panel, each top rail being perpendicular to opposed edges of the top panel;
    a plurality of side rails attached to the side panels, each side rail being coplanar with an associated top rail; and
    the plurality of linear actuators comprising four linear actuators, each linear actuator being slidably attached to a respective side rail.

6. The selectively extensible truck bed covering assembly of claim 5, wherein:
    the plurality of top rails comprises two top rails positioned singly proximate to a front edge and a rear edge of the top panel; and
    the plurality of side rails comprises four side rails positioned singly proximate to a front end and a rear end of each side panel.

7. The selectively extensible truck bed covering assembly of claim 1, wherein the plurality of linear actuators is electrically powered and configured for operationally engaging an electrical circuit of the truck.

8. The selectively extensible truck bed covering assembly of claim 1, further including a controller operationally engaged to the plurality of linear actuators and being configured to be mountable to the truck, such that the controller is positioned for selectively actuating the plurality of linear actuators.

9. The selectively extensible truck bed covering assembly of claim 8, further including:
    the controller comprising a receiver; and
    programming code selectively positionable on an electronic device of a user enabling the electronic device for selectively signaling the controller for actuating the plurality of linear actuators.

10. The selectively extensible truck bed covering assembly of claim 1, further including a plurality of mounting brackets, each mounting bracket being attached to a respective linear actuator and being configured for attaching to a respective bed rail of the truck.

11. A selectively extensible truck bed covering system comprising:
    a truck having a bed comprising a floor and a pair of sidewalls;
    a top panel sized and shaped substantially complementarily to a top opening of the bed;
    a pair of side panels slidably attached to the top panel, each side panel being hingedly mounted to a respective sidewall; and
    a plurality of linear actuators mounted to the bed of the truck in a vertical orientation perpendicular to the bed of the truck, the plurality of linear actuators being slidably attached to the pair of side panels, such that the plurality of linear actuators is positioned for selectively motivating the top panel and the side panels between a stowed configuration, wherein the top panel and the side panels are substantially parallel planar relative to a floor of the bed and are positioned atop the sidewalls, and a deployed configuration, wherein the side panels are nonplanar with the top panels, and wherein the top panel, the side panels, and the bed define a substantially cuboid compartment, each of the linear actuators remaining in the vertical orientation between the stowed configuration and the deployed configuration.

12. The selectively extensible truck bed covering system of claim 11, wherein:
    the top panel has a panel width substantially equivalent to a width of a top of a cab of the truck; and
    the side panel extends along the respective sidewall from proximate to the cab of the truck to proximate to a rear of the truck.

13. The selectively extensible truck bed covering system of claim 11, further including a plurality of hinges, each hinge being attached to a respective side panel proximate to a lower end of the respective side panel and to an associated sidewall of the bed.

14. The selectively extensible truck bed covering system of claim 11, further including:
   a plurality of top rails attached to the top panel, each top rail being perpendicular to opposed edges of the top panel;
   a plurality of side rails attached to the side panels, each side rail being coplanar with an associated top rail; and
   the plurality of linear actuators comprising four linear actuators, each linear actuator being slidably attached to a respective side rail.

15. The selectively extensible truck bed covering system of claim 14, wherein:
   the plurality of top rails comprises two top rails positioned singly proximate to a front edge and a rear edge of the top panel; and
   the plurality of side rails comprising four side rails positioned singly proximate to a front end and a rear end of each side panel.

16. The selectively extensible truck bed covering system of claim 11, wherein the plurality of linear actuators is electrically powered and operationally engaged to an electrical circuit of the truck.

17. The selectively extensible truck bed covering system of claim 11, further including a controller operationally engaged to the plurality of linear actuators mounted to the truck, such that the controller is positioned for selectively actuating the plurality of linear actuators.

18. The selectively extensible truck bed covering system of claim 17, further including:
   the controller comprising a receiver; and
   programming code positioned on an electronic device of a user enabling the electronic device for selectively signaling the controller for actuating the plurality of linear actuators.

19. The selectively extensible truck bed covering system of claim 11, further including a plurality of mounting brackets, each mounting bracket being attached to a respective linear actuator and to a respective bed rail of the truck.

20. A selectively extensible truck bed covering assembly comprising:
   a top panel sized and shaped substantially complementarily to a top opening of a bed of a truck, the top panel having a panel width substantially equivalent to a width of a top of a cab of the truck;
   a pair of side panels slidably attached to the top panel, each side panel being configured to be hingedly mountable to a respective sidewall of the bed, the side panel extending along the respective sidewall from proximate to the cab of the truck to proximate to a rear of the truck;
   a plurality of hinges, each hinge being attached to a respective side panel proximate to a lower end of the respective side panel and being configured for attaching to the sidewall of the bed;
   a plurality of top rails attached to the top panel, each top rail being perpendicular to opposed edges of the top panel, the plurality of top rails comprising two top rails positioned singly proximate to a front edge and a rear edge of the top panel;
   a plurality of side rails attached to the side panels, each side rail being coplanar with an associated top rail, the plurality of side rails comprising four side rails positioned singly proximate to a front end and a rear end of each side panel;
   a plurality of linear actuators configured to be mountable to the bed of the truck in a vertical orientation perpendicular to the bed of the truck, the plurality of linear actuators being slidably attached to the pair of side panels, such that the plurality of linear actuators is positioned for selectively motivating the top panel and the side panels between a stowed configuration, wherein the top panel and the side panels are substantially parallel planar relative to a floor of the bed and are positioned atop the sidewalls, and a deployed configuration, wherein the side panels are nonplanar with the top panels, and wherein the top panel, the side panels, and the bed define a substantially cuboid compartment, the plurality of linear actuators comprising four linear actuators, each linear actuator being slidably attached to a respective side rail, the plurality of linear actuators being electrically powered and configured for operationally engaging an electrical circuit of the truck, each of the linear actuators remaining in the vertical orientation between the stowed configuration and the deployed configuration;
   a controller operationally engaged to the plurality of linear actuators and being configured to be mountable to the truck, such that the controller is positioned for selectively actuating the plurality of linear actuators, the controller comprising a receiver;
   programming code selectively positionable on an electronic device of a user enabling the electronic device for selectively signaling the controller for actuating the plurality of linear actuators; and
   a plurality of mounting brackets, each mounting bracket being attached to a respective linear actuator and being configured for attaching to a respective bed rail of the truck.

* * * * *